US010577133B2

(12) United States Patent
White, Jr.

(10) Patent No.: US 10,577,133 B2
(45) Date of Patent: Mar. 3, 2020

(54) INTERPLANETARY SPACECRAFT

(71) Applicant: Wayne Neville White, Jr., Aurora, CO (US)

(72) Inventor: Wayne Neville White, Jr., Aurora, CO (US)

(*) Notice: Subject to any disclaimer, the term of this patent is extended or adjusted under 35 U.S.C. 154(b) by 225 days.

(21) Appl. No.: 15/607,898

(22) Filed: May 30, 2017

(65) Prior Publication Data

US 2017/0259946 A1   Sep. 14, 2017

(51) Int. Cl.
| | |
|---|---|
| *B64G 1/64* | (2006.01) |
| *B64G 1/12* | (2006.01) |
| *B64G 1/40* | (2006.01) |
| *B64G 1/60* | (2006.01) |
| *B64G 99/00* | (2009.01) |
| *B64G 1/54* | (2006.01) |
| *B64G 1/10* | (2006.01) |
| *B64G 1/26* | (2006.01) |

(Continued)

(52) U.S. Cl.
CPC ............ *B64G 1/64* (2013.01); *B64G 1/1078* (2013.01); *B64G 1/12* (2013.01); *B64G 1/26* (2013.01); *B64G 1/40* (2013.01); *B64G 1/401* (2013.01); *B64G 1/403* (2013.01); *B64G 1/405* (2013.01); *B64G 1/428* (2013.01); *B64G 1/543* (2013.01); *B64G 1/60* (2013.01); *B64G 1/646* (2013.01); *B64G 9/00* (2013.01); *B64G 1/402* (2013.01); *B64G 1/44* (2013.01); *B64G 2001/1064* (2013.01); *B64G 2001/1092* (2013.01)

(58) Field of Classification Search
CPC ... B64G 1/64; B64G 1/12; B64G 1/40; B64G 1/60; B64G 2001/1064; B64G 2001/1092
See application file for complete search history.

(56) References Cited

U.S. PATENT DOCUMENTS

| | | |
|---|---|---|
| 4,585,388 A | 4/1986 | Gossain |
| 4,685,535 A | 8/1987 | Bush |
| 4,757,767 A | 7/1988 | Wesselski |

(Continued)

OTHER PUBLICATIONS http://robotics.estec.esa.int/i-SAIRAS/isairas1999/s02-02.pdf.

(Continued)

*Primary Examiner* — Philip J Bonzell
*Assistant Examiner* — Tye William Abell

(57) ABSTRACT

Disclosed is a modular, human-crewed interplanetary spacecraft that is assembled in cislunar space. It is primarily comprised of a hollowed-out asteroid; five expandable habitation modules, one of which is expanded inside the asteroid cavity; two docking and airlock nodes; two landing craft suitable for exploring celestial bodies; structural support members; truss structures; robotic arms; a propulsion module; and shielding curtains that are filled with pulverized asteroidal material and attached to the truss structure. This configuration provides substantial radiation and meteoroid shielding. Upon completion of their mission, the crew will use the robotic arms to disconnect and mate (1) the asteroid containing the control module, (2) the forward docking and airlock node, and (3) the propulsion module. This crew-return vehicle will return to cislunar space. The remaining expandable modules with trusses, robotic arms, and landing craft will remain in the destination orbit to serve as a space station for future missions.

5 Claims, 11 Drawing Sheets

(51) Int. Cl.
*B64G 1/42* (2006.01)
*B64G 1/44* (2006.01)

(56) References Cited

U.S. PATENT DOCUMENTS

| | | | | |
|---|---|---|---|---|
| 4,929,011 | A | 5/1990 | Vandersluis | |
| 5,086,999 | A * | 2/1992 | Mullen | B64G 1/12 244/159.4 |
| 6,231,010 | B1 | 5/2001 | Schneider | |
| 6,439,508 | B1 * | 8/2002 | Taylor | B64G 1/12 244/158.3 |
| 6,547,189 | B1 * | 4/2003 | Raboin | B64G 1/12 244/158.3 |
| 6,899,301 | B2 | 5/2005 | Bigelow | |
| 6,962,310 | B1 | 11/2005 | Bigelow | |
| 7,469,864 | B2 | 12/2008 | Bigelow | |
| 7,509,774 | B1 * | 3/2009 | Johnson | B64G 1/12 244/129.3 |
| 8,210,481 | B2 * | 7/2012 | Kinstler | B64G 1/54 174/353 |
| 8,366,051 | B2 | 2/2013 | Bigelow | |
| 8,550,406 | B2 * | 10/2013 | Bigelow | B64G 1/54 244/158.1 |
| 8,578,663 | B2 * | 11/2013 | Bigelow | B64G 1/12 52/108 |
| 9,327,848 | B2 * | 5/2016 | Bigelow | B64G 1/56 |
| 9,567,116 | B2 | 2/2017 | Bigelow | |

OTHER PUBLICATIONS https://www.youtube.com/watch?v=qF9lysSGg2U.
http://www.aiaahouston.org/Horizons/Page17_Horizons_2011_11_and_12.jpg at p. 17.
http://www.aiaahouston.org/Horizons/B-2.3_repurposingISS.pdf.
http://www.spacepolicyonline.com/news/lockheed-martin-to-propose-2028-orbiting-mars-base-camp-today.
http://www.lockheedmartin.com/us/ssc/mars-orion.html.
https://vanwinkles.com/latest-science-of-cryogenic-sleep-human-hibernation-for-space-travel.
https://www.nasa.gov/feature/goddard/2017/camera-on-nasas-lunar-orbiter-survived-2014-meteoroid-hit.
https://en.wikipedia.org/wiki/Bigelow_Expandable_Activity_Module.
http://www.dailymail.co.uk/sciencetech/article-4152650/Radical-spacecraft-concept-ferry-people-MOON.html.
http://bigelowaerospace.com/b330/.
On a Long Trip to Mars, Cosmic Radiation May Damage Astronauts' Brains, http://www.livescience.com/56449-cosmic-radiation-may-damage-brains.html.
Risk of Acute and Late Central Nervous System Effects from Radiation Exposure, https://humanresearchroadmap.nasa.gov/evidence/reports/CNS.pdf.
Space Radiation Took a Toll on Apollo Astronauts, Study Says http://www.foxnews.com/science/2016/07/29/space-radiation-took-toll-on-apollo-astronauts-study-says.html.
Risk of Cardiovascular Disease and Other Degenerative Tissue Effects from Radiation Exposure https://humanresearchroadmap.nasa.gov/evidence/reports/Degen.pdf.
Spaceflight Radiation Carcinogenesis, https://en.wikipedia.org/wiki/Spaceflight_radiation_carcinogenesis.
Risk of Radiation Carcinogenesis https://humanresearchroadmap.nasa.gov/evidence/reports/Cancer.pdf.
Asteroid Redirect Mission concept: A Bold Approach for Utilizing Space Resources http://www.sciencedirect.com/science/article/pii/S0094576515002635.
https://en.wikipedia.org/wiki/Asteroids_in_fiction.
https://en.wikipedia.org/wiki/Eon_(novel).
https://web.archive.org/web/20070929123231/http://www.adherents.com/lit/bk_Pans_RiteOfPassage.html.
https://www.nasa.gov/pdf/179225main_ISS_Poster_Back.pdf.
https://www.nasa.gov/mission_pages/station/structure/elements/its.html#.WERkdKL_rhY.
https://www.nasa.gov/mission_pages/station/structure/elements/mss.html.
https://www.unlv.edu/news/release/study-significant-collateral-damage-cosmic-rays-increases-cancer-risks-mars-astronauts.
Meet the International Docking Adapter, https://en.wikipedia.org/wiki/International_Docking_Adapter.
Androgynous Peripheral Attach System [APAS], https://en.wikipedia.org/wiki/Androgynous_Peripheral_Attach_System.

* cited by examiner

INTERPLANETARY SPACECRAFT

CROSS REFERENCE TO RELATED APPLICATIONS

None.

STATEMENT REGARDING FEDERALLY SPONSORED R&D

No government rights: the owner/inventor received no government funding or in-kind government support during the process of conceiving this invention.

COPYRIGHTED MATERIAL

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

The present invention relates generally to human-crewed spacecraft, and more specifically to a modular interplanetary spacecraft that is assembled in space, and includes the use of asteroidal materials for radiation shielding.

2. Description of the Prior Art

The concept of inflatable space structures has been studied and developed over a period of many years. Early inflatable space structure concepts include U.S. Pat. No. 6,439,508 to Taylor, and U.S. Pat. No. 5,086,999 to Mullen. NASA personnel subsequently patented the inflatable Transhab concept in U.S. Pat. No. 6,231,010 to Schneider, and U.S. Pat. No. 6,547,189 to Raboin.

NASA later licensed the Transhab technologies to Bigelow Aerospace. Company founder Robert Bigelow added to the NASA designs in U.S. Pat. Nos. 6,899,301, 6,962,310, 8,366,051, 8,578,663, and 9,327,848. Another NASA patent, U.S. Pat. No. 7,509,774, details a method for incorporating portholes in the inflatable spacecraft without compromising structural integrity.

In recent years, Bigelow Aerospace has demonstrated expandable space structures with soft-shell exteriors made of generally pliable and flexible material (note that Bigelow Aerospace now refers to its modules as "expandable" rather than "inflatable)". These structures do not require human assembly; they launch collapsed and assembly personnel expand them after they reach orbit. Two separately-launched Bigelow expandable modules are currently in low-Earth orbit that did not require human assembly after launch—Genesis I and Genesis II.

The Bigelow Expandable Activity Module ("BEAM") is an experimental expandable space station module developed by Bigelow Aerospace, under contract to NASA, for testing as a temporary module on the International Space Station ("ISS") from 2016 to 2018. The BEAM module arrived at the ISS on Apr. 10, 2016, was berthed to the station on April 16, and was expanded and pressurized on May 28, 2016. en.wikipedia.org/wiki/Bigelow-Expandable-Activity-Module, accessed May 24, 2017.

U.S. Pat. No. 7,469,864 to Bigelow describes a method of assembling a habitable structure comprised of a plurality of expandable structures, connecting nodes, busses, and landing pads that are assembled in orbit, and subsequently landed on the surface of a celestial body such as the Moon. This structure can be assembled robotically.

Charles Bombardier of Imaginactive, a Canadian non-profit organization, has publicly disclosed a spacecraft that is comprised of expandable Bigelow modules mated together. The artist's conception of the spacecraft includes one robotic arm, although the use for that robotic arm has not been publicly disclosed. Mr. Bombardier's spacecraft concept, as publicly disclosed, does not include use of asteroidal materials for radiation shielding, and does not contemplate the separation and reconnection of spacecraft modular elements as part of spacecraft mission operations. www.dailymail.co.uk/sciencetech/article-4152650/Radical-spacecraft-concept-ferry-people, accessed May 24, 2017.

Bigelow Aerospace is in the process of developing the B330 module, which is substantially larger than Genesis II. Each Bigelow B330 habitation module includes life support systems and thermal system radiators. bigelowaerospace.com/b330, accessed May 24, 2017

The Bigelow Aerospace website says that "The [Bigelow B330] module provides radiation protection equivalent to or better than existing International Space Station modules" bigelowaerospace.com/b330/ accessed May 24, 2017. Such protection, however, will not be adequate in the much harsher radiation environment that lies outside of the Earth's magnetosphere.

On long-duration interplanetary missions, much more robust radiation shielding will be required in order to avoid excessively adverse health consequences to the crew. A recent article in the journal Scientific Reports sets forth a NASA rodent study's finding "that the radiation [equivalent to a six-month one-way trip to Mars] caused significant long-term brain damage, including cognitive impairments and dementia, a result of brain inflammation and damage to the rodents' neurons" *On a Long Trip to Mars, Cosmic Radiation May Damage Astronauts' Brains*, www.livescience.com/56449-cosmic-radiation-may-damage-brains.html accessed May 24, 2017; *Risk of Acute and Late Central Nervous System Effects from Radiation Exposure* humanresearchroadmap.nasa.gov/evidence/reports/CNS.pdf accessed May 24, 2017. Thus, a mission to Mars utilizing current shielding methods would result in long-term brain and central nervous system damage that would adversely affect the crew's ability to make decisions, thereby threatening the safety and success of the mission.

An earlier study in Scientific Reports found that "Astronauts who never flew, or who flew in low-Earth orbit, had much lower rates of death from heart disease than the Apollo astronauts." The study concluded "These data suggest that human travel into deep space may be more hazardous to cardiovascular health than previously estimated" *Space Radiation Took a Toll on Apollo Astronauts, Study Says* www.foxnews.com/science/2016/07/29/space-radiation-took-toll-on-apollo-astronauts-study-says.html; *Risk of Cardiovascular Disease and Other Degenerative Tissue Effects from Radiation Exposure* humanresearchroadmap.nasa.gov/evidence/reports/Degen.pdf, accessed May 24, 2017.

The Wikipedia entry "Spaceflight Radiation Carcinogenesis" (en.wikipedia.org/wiki/Spaceflight-radiation-carcinogenesis, accessed May 24, 2017) summarizes other studies over a long period of time that have documented higher rates of cancer among astronauts who travel in deep space.

One of the main roadblocks to interplanetary travel is the risk of cancer caused by radiation exposure. The largest contributors to this roadblock are: (1) The large uncertainties associated with cancer risk estimates, (2) The unavailability of simple and effective countermeasures and (3) The inability to determine the effectiveness of countermeasures.

Operational parameters that need to be optimized to help mitigate these risks include:
length of space missions
crew age
crew gender
shielding
biological countermeasures Risk of Radiation Carcinogenesis humanresearchroadmap-.nasa.gov/evidence/reports/Cancer.pdf, accessed May 24, 2017 (emphasis added).

In a press release dated Jun. 5, 2017, the University of Nevada Las Vegas announced that "The cancer risk for a human mission to Mars has effectively doubled following a UNLV study predicting a dramatic increase in the disease for astronauts traveling to the red planet or on long-term missions outside the protection of Earth's magnetic field. The findings appeared in the May issue of Scientific Reports and were presented by UNLV scientist Francis Cucinotta, a leading scholar on radiation and space physics.

. . . Exploring Mars will require missions of 900 days or longer and includes more than one year in deep space where exposures to all energies of galactic cosmic ray heavy ions are unavoidable," Cucinotta explained. *"Current levels of radiation shielding would, at best, modestly decrease the exposure risks.*

. . . Galactic cosmic ray exposure can devastate a cell's nucleus and cause mutations that can result in cancers," Cucinotta explained. "We learned the damaged cells send signals to the surrounding, unaffected cells and likely modify the tissues' microenvironments. Those signals seem to inspire the healthy cells to mutate, thereby causing additional tumors or cancers." www.unlv.edu/news/release/study-significant-collateral-damage-cosmic-rays-increases-cancer-risks-mars-astronauts, accessed Jun. 25, 2017 (emphasis added).

Another risk posed by an interplanetary mission is the possibility of a meteoroid impact that would damage the spacecraft. www.nasa.gov/feature/goddard/2017/camera-on-nasas-lunar-orbiter-survived-2014-meteoroid-hit, accessed May 28, 2017. The probability of such an impact is higher on long-term interplanetary missions.

"The utilization of natural resources from asteroids is an idea that is older than the Space Age. The technologies are now available to transform this endeavor from an idea into reality. The [NASA] Asteroid Redirect Mission (ARM) is a mission concept which includes the goal of robotically returning a small Near-Earth Asteroid (NEA) or a multi-ton boulder from a large NEA to cislunar space in the mid-2020s using an advanced Solar Electric Propulsion (SEP) vehicle and currently available technologies. The paradigm shift enabled by the ARM concept would allow in-situ resource utilization (ISRU) to be used at the human [deep-space] mission departure location (i.e., cislunar space) versus exclusively at the deep-space mission destination. This approach drastically reduces the barriers associated with utilizing ISRU for human deep-space missions." *Asteroid Redirect Mission concept: A Bold Approach for Utilizing Space Resources*, www.sciencedirect.com/science/article/pii/S0094576515002635/ accessed May 24, 2017. As of the date this application is submitted, NASA does not plan on proceeding with the Asteroid Redirect Mission. Nonetheless, commercial development of the capability to capture and maneuver asteroids, and to process materials from an asteroid in situ are very desirable and useful capabilities that the United States should encourage.

The company Made in Space received a 2016 Phase I NASA Innovative Advanced Concepts (NIAC) award for Project RAMA, a proposal to mine asteroids and use additive manufacturing to create spacecraft systems from the asteroidal materials. This proposal would use the asteroid as an autonomous spacecraft. It does not mention any human crews, does not include any spacecraft elements launched from Earth, and is not modular. Made In Space says the technology and infrastructure could be in place in 20-30 years. www.nasa.gov/feature/reconstituting-asteroids-into-mechanical-automata/, accessed May 24, 2017.

The idea of using a hollowed-out asteroid as a spacecraft has appeared in a number of science fiction novels, including, among others, Eon by Greg Bear and Rite of Passage by Alexei Panshin. However, these fictional spacecraft are city-sized, and the bodies of the spacecraft are solely comprised of an asteroid, rather than incorporating an asteroid into a vehicle comprised of other elements in addition to the asteroid. Also, asteroids were not used in these stories for the specific purpose of providing radiation shielding. en.wikipedia/wiki/Asteroids in fiction; en.wikipedia.org/wiki/Eon (novel); web.archive.org/web/w0070929123231 www.adherents.com/lit/bk Pans RiteOfPassage.html, accessed May 24, 2017.

No prior patents or patent applications known to the inventor propose the use of a hollowed-out asteroid and pulverized asteroidal materials as a method of radiation and meteoroid shielding that is incorporated into a spacecraft to protect human occupants.

U.S. Pat. No. 8,210,481 to Kinstler describes a magnetic field generator composed of superconducting material that can shield a spacecraft and its human occupants from radiation. This concept also includes shielding to protect electronic components from the magnetic field. U.S. Pat. No. 8,550,406 to Bigelow describes a similar magnetic shield. The Technology Readiness Level of these concepts is unknown. The amount of power required to generate these magnetic fields, and the effectiveness of their shielding are also unknown. This shielding method would not provide protection from meteoroid impacts.

The ISS is a structure in low-Earth orbit that is comprised of a plurality of human-inhabited modules and other structures (e.g. www.nasa.gov/pdf/179225main ISS Poster Back.pdf accessed May 24, 2017) that include, among other things, solar arrays, thermal radiators, an ammonia cooling system, docking nodes, an Integrated Truss Structure (www.nasa.gov/mission pages/station/structure/elements/its html #.WERkdKL rhY, accessed May 24, 2017), the Space Station Remote Manipulator System (SSRMS) known as Canadarm2 (U.S. Pat. No. 4,585,388 to Gossain) (www.nasa.gov/mission pages/station/structure/elements/mss.html accessed May 24, 2017), the Mobile Transporter Cart (U.S. Pat. No. 4,757,767 to Wesselski), which hosts the Mobile Remote Servicer Base System (MBS) (U.S. Pat. No. 4,685,535 to Bush), and the Special Purpose Dexterous Manipulator (SPDM, also known as Dextre) (e.g. robotics.estec-.esa.int/i SAIRAS/isairas1999/s02 02.pdf, accessed May 24, 2017).

The SSRMS can move along rails on the Integrated Truss Structure on top of the US—provided Mobile Transporter cart, which hosts the MRS Base System. Both ends of the SSRMS arm can attach to power/video/data "grapple fixtures" that are located at various points on the ISS trusses (U.S. Pat. No. 4,929,011 to Vandersluis). Unpowered "Flight-Releasable Grapple Fixtures" (FRGFs) can be attached to payloads that will be delivered to the ISS, so that they can be captured and maneuvered by the SSRMS when the payload arrives at the station. The following video illustrates the operation of the SSRMS and Dextre utilizing grapple fixtures: www.youtube.com/watch?v=qF9IysSGg2U, accessed May 24, 2017.

Boeing describes the Active Thermal Control System on the ISS as follows: "Most of the Station's many systems produce waste heat, which needs to be transferred from the ISS to space to achieve thermal control and maintain components at acceptable temperatures. An Active Thermal Control System (ATCS) is required to achieve this heat rejection function when the combination of the ISS external environment and the generated heat loads exceeds the capabilities of the Passive Thermal Control System to maintain temperatures. An ATCS uses a mechanically pumped fluid in closed-loop circuits to perform three functions: heat collection, heat transportation, and heat rejection. Waste heat is removed in two ways, through cold plates and heat exchangers, both of which are cooled by a circulating ammonia loops on the outside of the station. The heated ammonia circulates through large radiators located on the exterior of the Space Station, releasing the heat by radiation to space that cools the ammonia as it flows through the radiators. www.nasa.gov/pdf/473486main_iss_atcs_overview.pdf (accessed Dec. 6, 2019)

NASA describes the ISS Integrated Truss as follows: "The Integrated Truss Structure acts as a backbone for the International Space Station. A truss is a segment or part of the whole Integrated Truss Structure. The trusses are used to support the solar arrays and radiators. The solar arrays provide energy for the Station, and the radiators get rid of extra heat that builds up in the Station . . . Truss segments are labeled based on their location. P stands for "port," which is a nautical term for "left." S stands for "starboard," which is a nautical term for "right." Z stands for "zenith," meaning "up" or "away from Earth." External utilities like power, data, and video are routed to the Station through the truss segment. www.nasa.gov/pdf/179225main_ISS_Poster_Back.pdf (accessed Dec. 6, 2019)

In 2011, Boeing's Deputy ISS Manager, Michael Raftery, proposed using the ISS as "a testbed for new technology, as an analog for interplanetary vehicles, or as a 'base camp' for exploratory vehicles." "This base camp would effectively be a detached module of the ISS which would either be built in LEO and transferred to an Earth-Moon libration point, or launched directly to that destination and assembled there." (www.aiaahouston.org/Horizons/Page 17 Horizons 2011 11 and 12.jpg, accessed May 24, 2017). This concept does not include the incorporation of expandable modules in a human-transportation spacecraft, does not include the use of a hollowed-out asteroid or other asteroidal materials as radiation and meteoroid shielding, and does not propose a modular spacecraft that is designed for mechanical detachment and re-assembly of modules, utilizing robotic arms such as those used on the ISS. This proposal does not discuss the materials service-life of repurposed ISS components that have been exposed to space radiation for extended periods of time.

U.S. Pat. No. 7,780,119 to Johnson describes a modular spacecraft that would utilize technologies from a Centaur upper stage. This concept does not include the incorporation of expandable modules in a human-transportation spacecraft, does not include the use of a hollowed-out asteroid or other asteroidal materials as radiation and meteoroid shielding, and does not propose a modular spacecraft that is designed for mechanical detachment and re-assembly of modules, utilizing robotic arms such as those used on the ISS.

U.S. Pat. No. 7,374,134 to Collyer describes methods for electro-welding modular elements of a spacecraft, and for de-bonding the module welds at a later time. This concept does not include the incorporation of expandable modules in a human-transportation spacecraft, does not include the use of a hollowed-out asteroid or other asteroidal materials as radiation and meteoroid shielding, and does not propose a modular spacecraft that is designed for mechanical detachment and re-assembly of modules, utilizing robotic arms such as those used on the ISS.

In 2016, Shen Ge and Yvonne Vigue-Rodi proposed that U.S. elements of the ISS be disassembled from the ISS when the United States government ceases operations. These ISS elements would then be transported to lunar orbit or one of the Earth-Moon Lagrangian points, for assembly and re-use as a lunar space station. www.aiaahouston.org/HorizonsB 2.3 repurposingISS.pdf accessed May 24, 2017. This proposal does not mention the incorporation of expandable modules in a human-transportation spacecraft, does not include the use of a hollowed-out asteroid or other asteroidal materials as radiation and meteoroid shielding, and does not propose a modular spacecraft that is designed for mechanical detachment and re-assembly of modules utilizing robotic arms such as those used on the ISS. This proposal does not discuss the materials service-life of repurposed ISS components that have been exposed to space radiation for extended periods of time.

In 2016 Lockheed Martin first presented its "Mars Base Camp" concept. www.spacepolicyonline.com/news/Lockheed martin to propose 2028 orbiting mars base, accessed May 24, 2017. This spacecraft is modular, with some elements assembled in cislunar space, and a solar electric propulsion-powered laboratory module launched into Mars orbit prior to departure of the larger human-crewed spacecraft. The Mars Base Camp spacecraft would be comprised of two Orion capsules, a crew quarters module surrounded by liquid oxygen and liquid hydrogen tanks which would provide additional radiation shielding and propulsion fuel, a habitat module, a laboratory module, radiators, solar arrays, and a cryostage propulsion module. The solar electric propulsion-powered lab module would dock with the Mars Base Camp spacecraft when it arrives in Mars orbit. All elements of the spacecraft (except perhaps the solar electric propulsion-powered lab) would be launched from Earth utilizing NASA's Space Launch System. www.lockheedmartin.com/us/ssc/mars, accessed May 24, 2017. This concept does not include expandable modules, does not include the use of a hollowed-out asteroid or other asteroidal materials as radiation and meteoroid shielding, does not include robotic arms, and is not designed for detachment and re-assembly of modules utilizing the robotic arms. This concept would also not leave a space station in Mars orbit, and would not have the capability of landing humans on the surface of Mars.

NASA has funded at least one study of cryogenic deep sleep, which is also referred to as "hibernation." This technology would be very valuable for a Mars mission. It would reduce the amount of food, water, oxygen, and other supplies consumed by the crew, and thereby reduce the mass of the spacecraft's cargo. On long distance missions, hibernating the crew during the trips to and from the destination would avoid any concerns about the psychological effects of being confined in a relatively small space with other people for an extended period of time. vanwinkles.com/latest-science-of-cryogenic-sleep-human-hibernation-for-space-travel.

SUMMARY OF THE INVENTION

It is the intention of this inventor to provide an interplanetary, human-crewed spacecraft that includes and builds upon existing United States civil and commercial space technologies, including without limitation expandable habitation modules, ISS technologies, and propulsion technologies. This spacecraft is comprised of a hollowed-out asteroid and other asteroidal materials, five expandable habitation modules, other spacecraft elements based upon ISS technologies, and a propulsion module that will utilize the propulsion technologies that are most appropriate for the spacecraft's missions.

The primary object of the present invention is to provide radiation shielding that is far more effective than other human spacecraft designs, for the purpose of protecting crew and passengers from the adverse health consequences of extended missions in harsh, deep-space and planetary radiation environments. The spacecraft utilizes a hollowed-out asteroid with exterior walls at least 2 meters thick. An expandable control module is then expanded inside the asteroid cavity to achieve a very high degree of radiation shielding in the control module during the journey to and from the mission destination. Channeled curtains containing pulverized asteroidal material are affixed to the trusses on each of the four sides of the spacecraft to provide radiation shielding for the expandable modules aft of the control module.

Another object of the present invention is to provide a modular spacecraft that can provide protection from meteoroid impacts. The asteroid and the channeled shielding curtains provide this protection.

Another object of the present invention is to provide a modular spacecraft that can be assembled relatively quickly. Astronaut crews will assemble the spacecraft at Earth-Moon Lagrangian point L4 or L5 (the "Staging and Assembly Area").

Another object of the present invention is to provide a modular spacecraft with much lower research and development, manufacturing, and assembly costs than other interplanetary spacecraft designs. The expandable habitation modules and ISS technologies utilized in this spacecraft are proven technologies that will require little further research and development to incorporate into the spacecraft. Voluminous data is available regarding assembly and operation of these systems.

Another object of the present invention is to provide a spacecraft that is safer for astronauts, because autonomy, teleoperation, and robotic technologies can greatly reduce the number of human extravehicular activities (EVAs) that will be required to assemble and maintain the spacecraft.

Another object of the present invention is to provide a spacecraft that has unique capabilities never offered by any other interplanetary spacecraft design. After the crew and passengers complete work at their destination, the two robotic arms running on rails along the spacecraft's truss structure will grapple and detach the asteroid-enclosed control module, the forward docking and airlock node, and the propulsion module. The robotic arms will then mate the asteroid-enclosed control module, the docking and airlock node, and the propulsion module to form a Crew-Return Vehicle, as illustrated in FIG. 11.

Detachment and mating of the Crew-Return Vehicle will leave a space station in orbit at the mission destination comprised of modules #2 through #5, structural support members, trusses, a docking and airlock node, thermal and life-support systems, the secondary computer network, solar arrays, two Mobile Transporter Carts, and the attached Mobile Remote Servicer Base Systems (MBS), two robotic arms, and two landing craft, as illustrated in FIG. 11. This space station can be used in future missions.

The crew and any passengers will return to the Staging and Assembly area in the Crew-Return Vehicle. The Crew-Return Vehicle will dock with a space capsule at the Staging and Assembly area, and the crew and passengers will return to the Earth's surface in this capsule. The Crew-Return Vehicle will remain at the Staging and Assembly area and can be used in future missions.

BRIEF DESCRIPTION OF THE DRAWINGS

FIG. 11 also shows the remaining modules, support members, trusses, nodes, landers, and robotic arms that will remain at the destination orbit to serve as a space station.

DETAILED DESCRIPTION OF THE INVENTION

1. Definitions

The American Heritage Science Dictionary defines "Lagrangian Point" as "A point in space where a small body with negligible mass under the gravitational influence of two large bodies will remain at rest relative to the larger ones. In a system consisting of two large bodies (such as the Sun-Earth system or the Moon-Earth system), there are five Lagrangian points (L1 through L5). Knowledge of these points is useful in deciding where to position orbiting bodies." www.dictionary.com/browse/Lagrangian-point, (accessed May 24, 2017).

Wikipedia defines nautical direction terms as follows:
Aft—toward the stern (rear) of a ship;
Fore or forward—at or toward the front of a ship or further ahead of a location (opposite of "stern");
Port—"the left side of the ship, when facing forward (opposite of "starboard"); and
Starboard—"the right side of the ship, when facing forward (opposite of "port"). en.wikipedia.org/wiki/List_of_ship_directions, accessed Dec. 6, 2019.

2. Best Mode of the Invention

Figure 8:
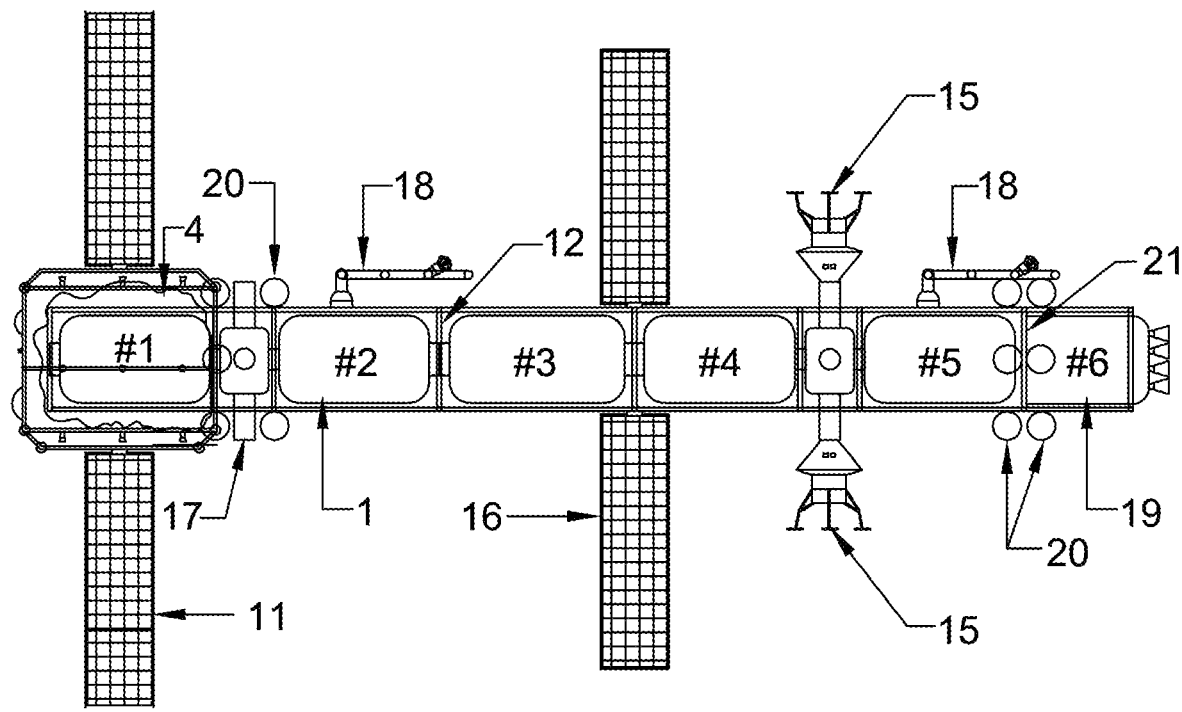
FIG. 8 is a top view of the assembled spacecraft.
Figure 11:
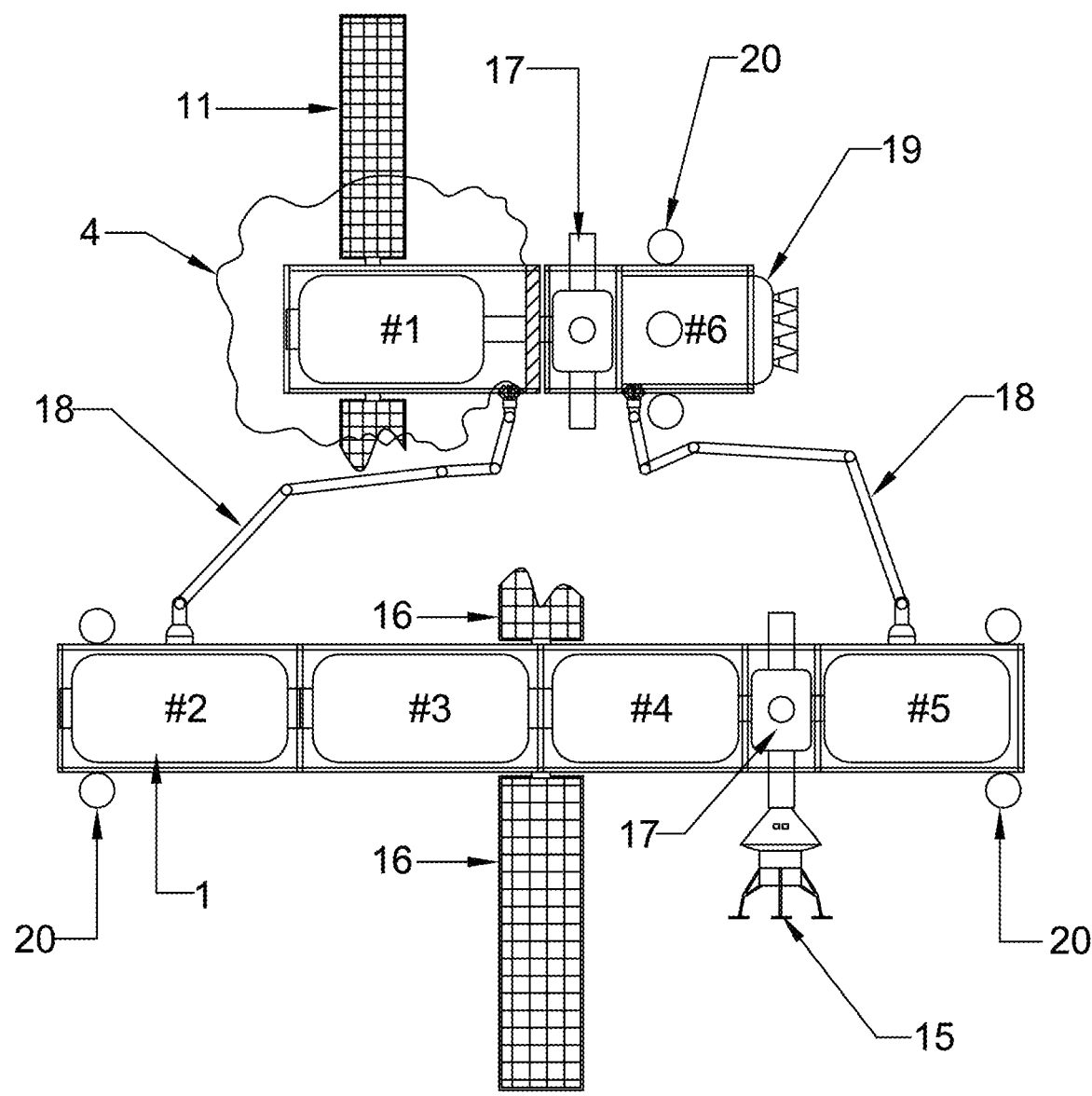
FIG. 11 is a top view of the robotic arms mating the command module and docking assembly to the propulsion module, comprising the Crew-Return Vehicle.

FIG. 8 shows a top view of the fully-assembled spacecraft with channeled shielding curtains attached to the truss structure. FIG. 11 is a top view of the robotic arms mating the command module and docking and airlock node to the propulsion module to form a Crew-Return Vehicle, and the remaining modules, support members, trusses, nodes, landers, and robotic arms that will remain at the destination orbit to serve as a space station. Together these figures illustrate the best mode contemplated by the inventor. according to the concepts of the present invention.

3. How to Make the Invention

Pursuant to a prize competition or contract, a commercial space-mining company or other organization will hollow-out a cavity inside an asteroid 25 with cavity walls a minimum of 2 meters thick 4 and will transport the hollowed-out asteroid 4 to the Staging and Assembly area.

Figure 2:
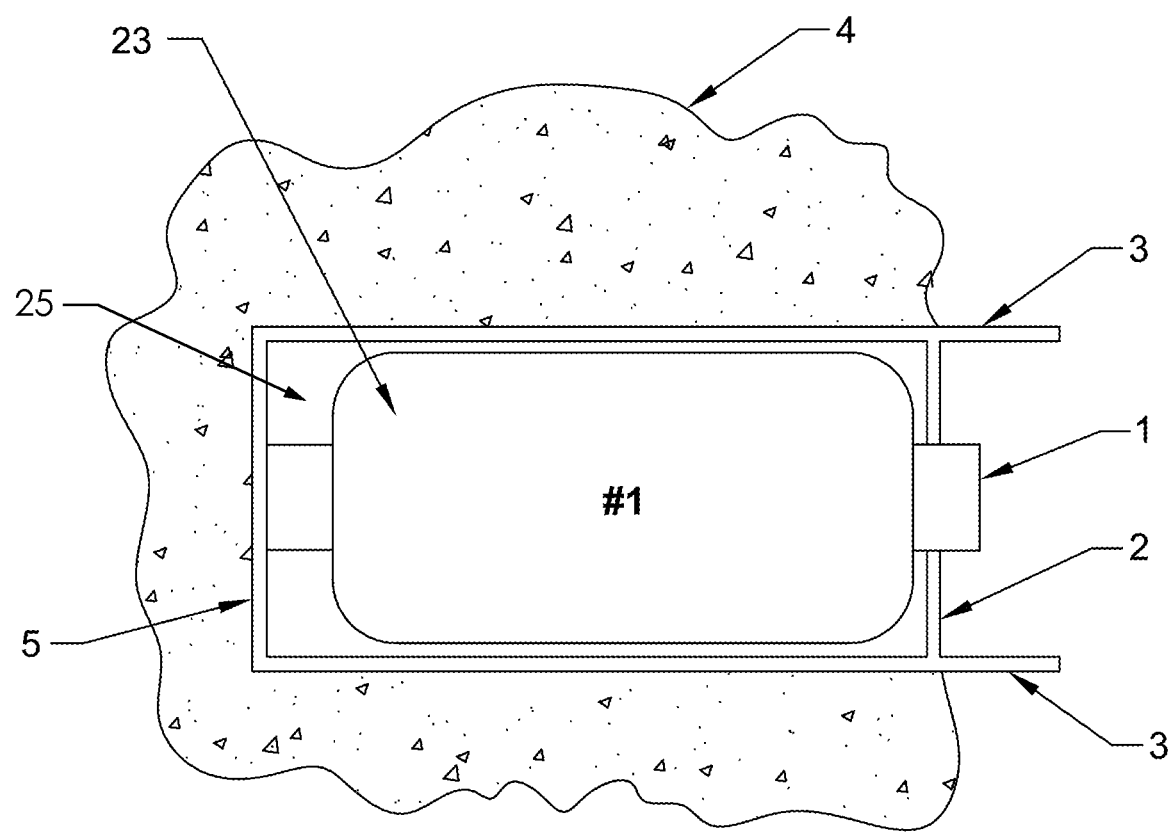
FIG. 2 is a cross-sectional view of the hollowed-out asteroid with the expandable module in its expanded mode.
Figure 3:
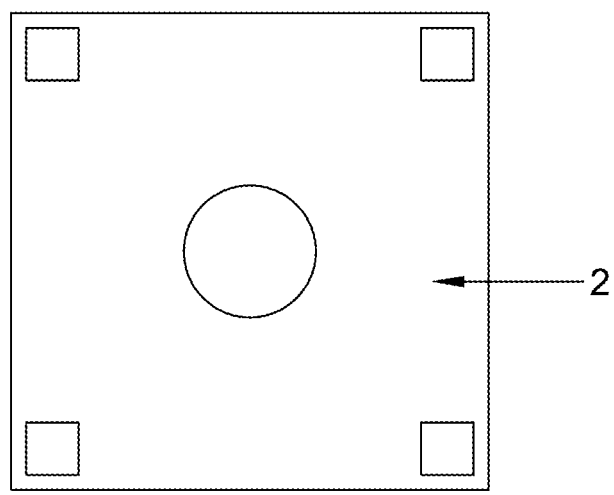
FIG. 3 is a front view of the control module sealing plate.

Launch vehicles will transport five expandable habitation modules 1 in their unexpanded mode from the surface of the Earth to the Staging and Assembly area, with a mounting plate 5 and a sealing plate 2 attached to module 1, #1, as shown in FIG. 2, and stowed structural support members 12 attached to the forward and aft ends of modules #2 through #5.

Figure 1:
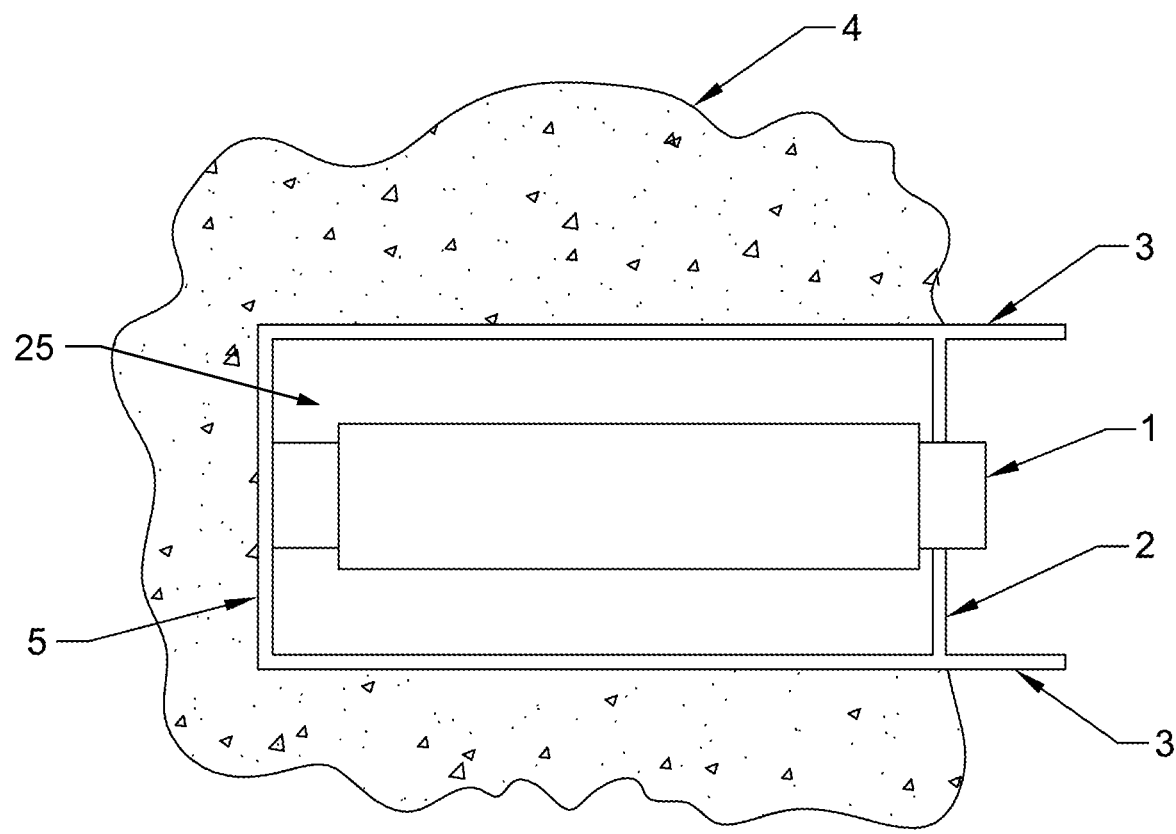
FIG. 1 is a cross-sectional view of the hollowed-out asteroid with the expandable control module mounted inside the asteroid, in its un-expanded mode.

The expandable module operator will maneuver Module 1, #1 and the attached mounting plate 5 and sealing plate 2 so that the expandable module is beside the asteroid. The spacecraft assembly crew will remove the mounting plate 5 from module #1, and securely attach the mounting plate 5 to the forward end of the hollow asteroid cavity 25, as shown in FIG. 1.

The expandable module operator will then maneuver or initiate maneuver of unexpanded module 1, #1 so that it is firmly seated inside the mounting plate 5, and the sealing plate 2 is lined up so that the truss beams 3 can pass through the holes in the sealing plate 2. The assembly crew will then pass the four trusses 3 through the sealing plate 2 and attach the sealing plate 2 to the aft end of the asteroid 4 so that it is flush with the outside of the asteroid, as shown in FIG. 1.

The spacecraft assembly crew will then dock and mate the forward side of a forward docking and airlock node 17 to the aft end of module 1, #1, as shown in FIG. 8.

The expandable module operator will maneuver or initiate maneuver of modules 1, #2 through #4, one at a time, so that the forward end of module 1, #2 docks and mates with the aft side of the forward docking and airlock node 17, the forward end of module 1, #3 docks and mates with the aft end of module 1, #2, and the forward end of module 1, #4 docks and mates with the aft end of module 1, #3, as shown in FIG. 8.

The spacecraft assembly crew will then dock and mate the forward side of the aft docking and airlock node 17 with the aft end of module 1, #4, and maneuver or initiate maneuver of module 1, #5 so that the forward end of module 1, #5 docks and mates with the aft side of the aft docking and airlock node 17, as shown in FIG. 8.

The expandable module operator will then pressurize each module 1 with air, beginning with the control module 1, #1 inside the asteroid 4, and then sequentially pressurizing modules 1, #2 through #5.

Launch vehicles will transport to the Staging and Assembly area four trusses 3, sensors 6, imaging cameras 7, communications equipment 8, attitude control thrusters 9, secondary solar arrays 11, spherical storage tanks 20, components of a primary computer network 23 and secondary computer network 24, a magnetic field generator 27, and two radiators 28.

As shown in FIG. 4B, the expandable module operator will then deploy the structural support members 12 that are attached to modules 1, #2 through #5.

The spacecraft assembly crew will then attach the four trusses 3 to the deployed structural support members 12 on modules 1, #2 through #5.

Figure 4:
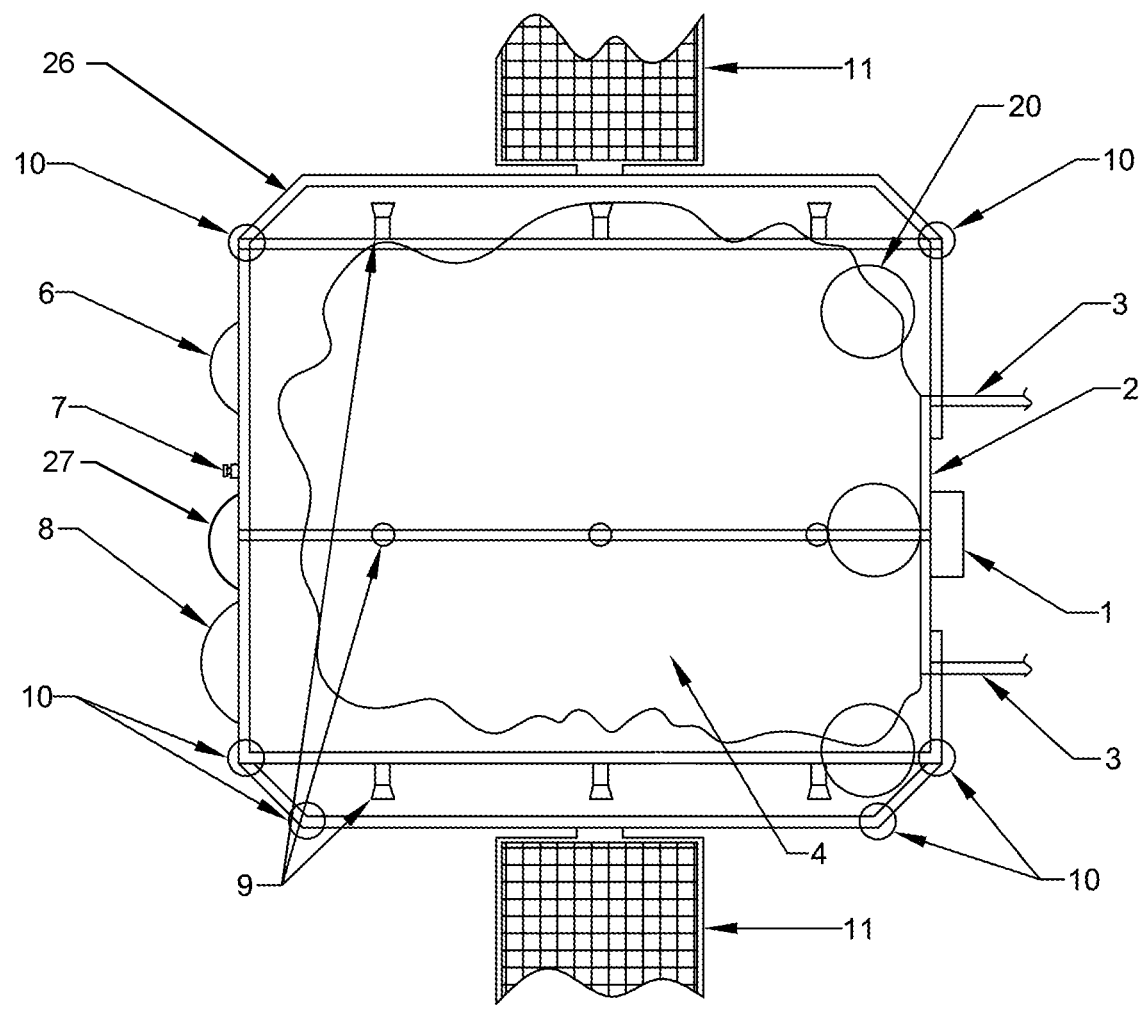
FIG. 4 is a top view of the hollowed-out asteroid and expandable module, with truss superstructure, solar panels, and external equipment.
Figure 5A:
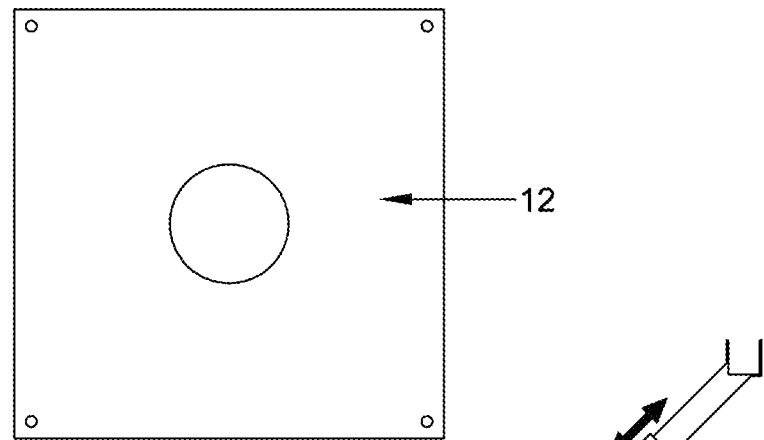
FIG. 5A. is a front view of the module structural support member in its stowed position.
Figure 5B:
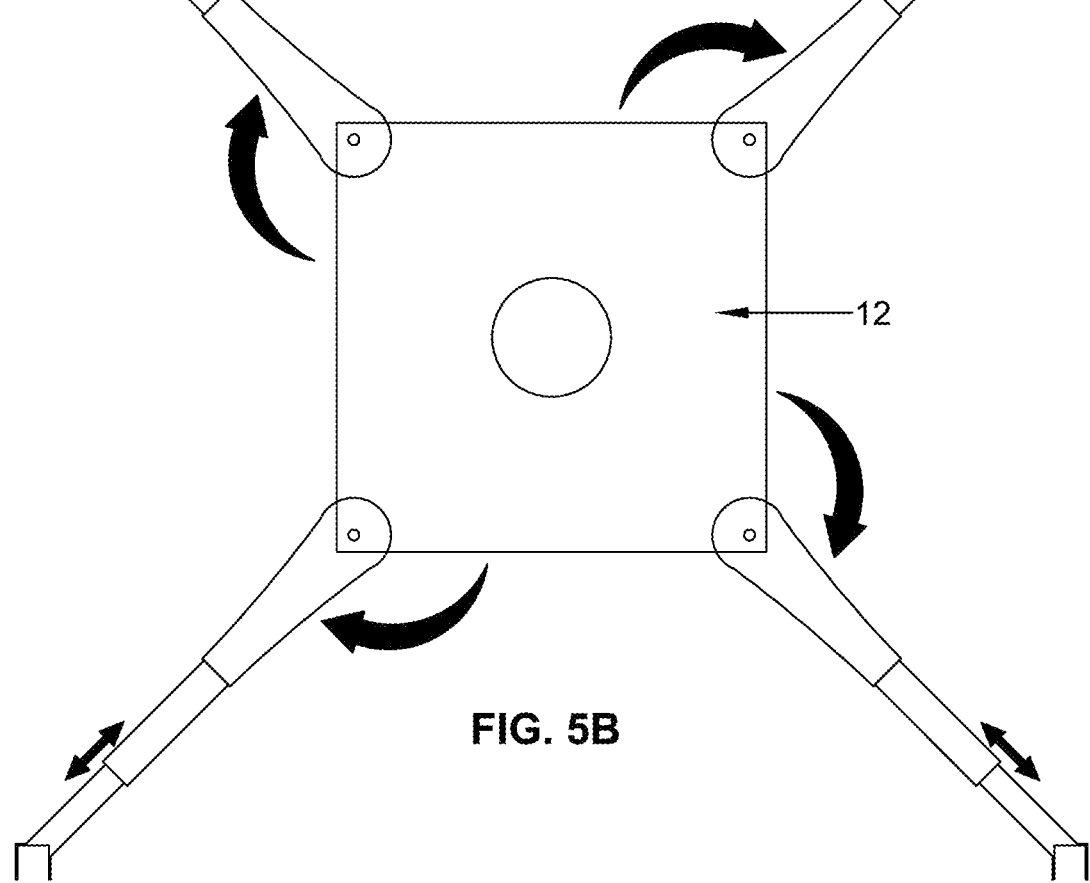
FIG. 5B is a front view of the module structural support member in its deployed position.

The assembly crew will then attach the secondary solar arrays 11 to the lower port and lower starboard structural members of the asteroid superstructure 26, as shown in FIG. 4.

The assembly crew will then attach and install on the asteroid superstructure 26 sensors 6, communications equipment 8, imaging cameras 7, attitude control thrusters 9, spherical storage tanks 20, and a magnetic field generator 27 as shown on FIG. 4.

A launch vehicle will transport the primary solar arrays 16 to the Assembly and Staging Area.

The assembly crew will then attach the primary solar arrays 16 to the lower port and starboard trusses 31 and 32, adjacent to the point where habitation modules 1, #3 and #4 are docked, as shown in FIG. 8. The assembly crew will also attach the two radiators 28 to the lower port and starboard trusses 29 and 30 adjacent to the point where modules 1, #2 and #3 are docked as shown on FIG. 6B.

A launch vehicle will transport two robotic arms 18 to the Staging and Assembly Area.

Figure 6A:
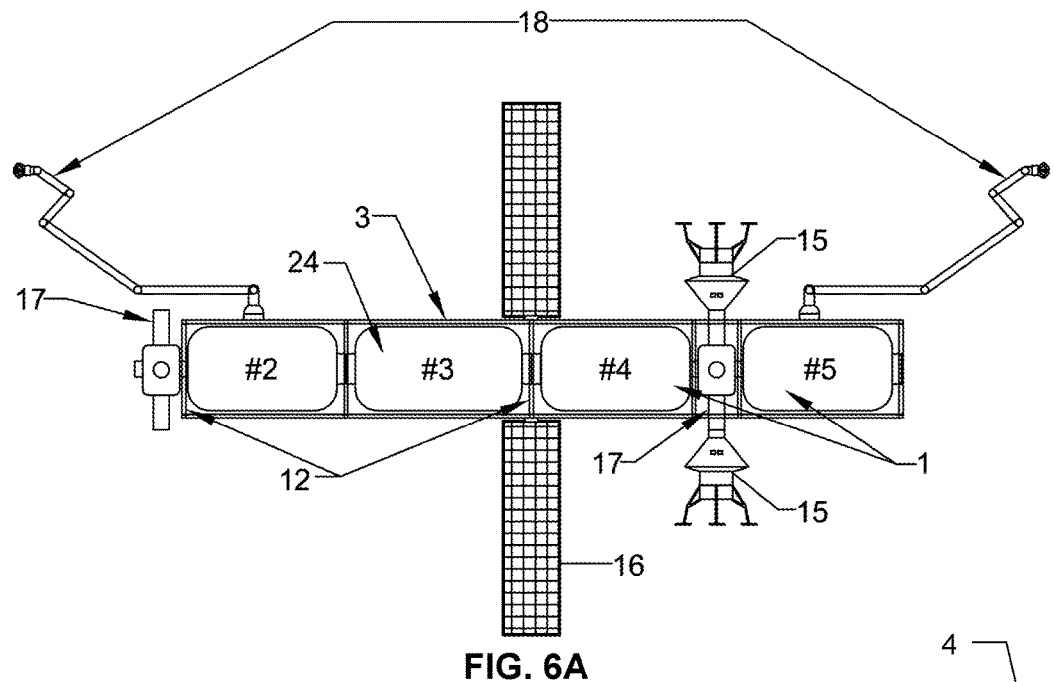
FIG. 6A is a top view of modules #2 through #5, with truss structure, docking nodes, landers, and robotic arms.
Figure 6B:
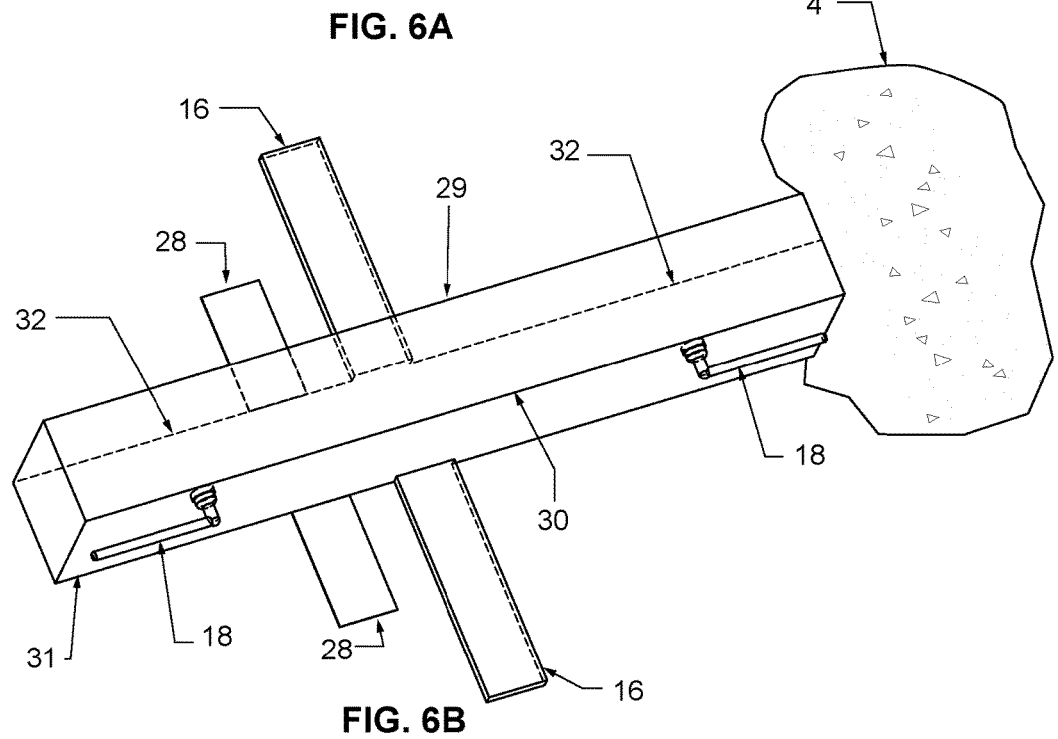
FIG. 6B identifies the upper port truss, the upper starboard truss, the lower starboard truss and the lower port truss and shows where the primary solar arrays, radiators, and robotic arms are mounted on the trusses.

The spacecraft assembly crew will install the two robotic arms 18 on the upper starboard truss as shown on FIG. 6A.

Figure 7A:
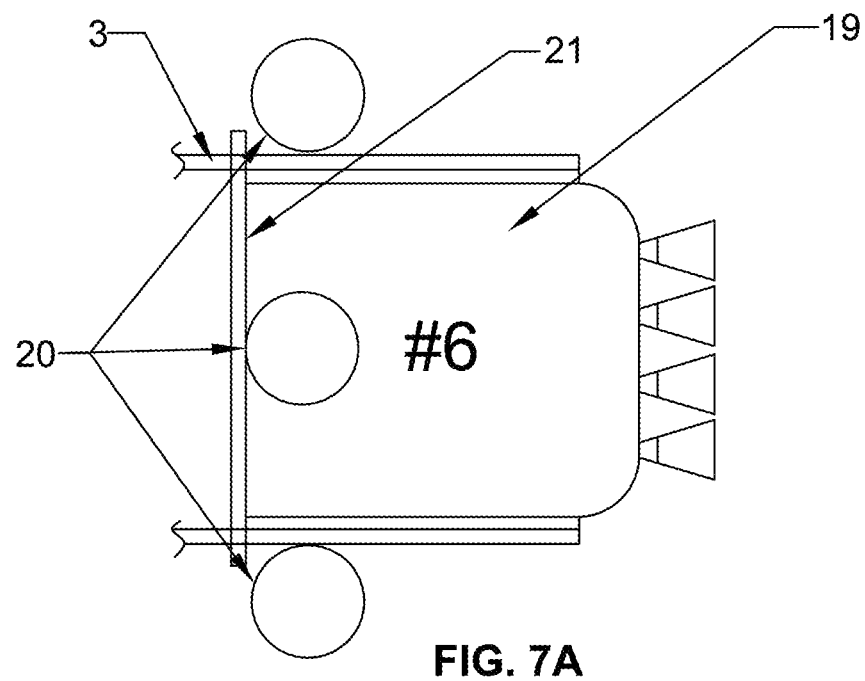
FIG. 7A is a top view of the propulsion module.
Figure 7B:
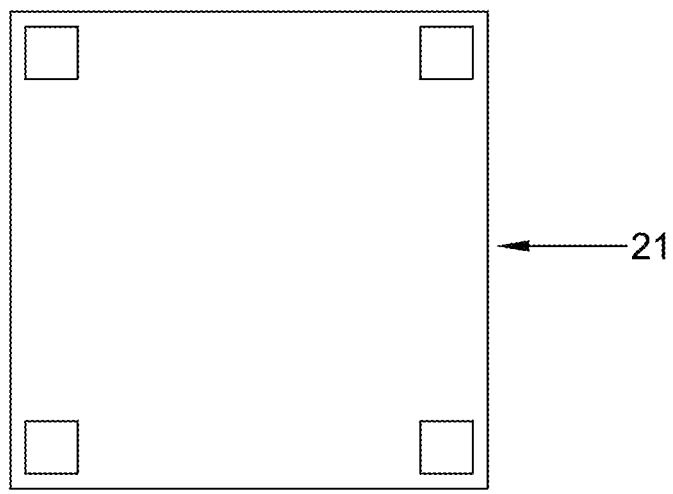
FIG. 7B is a front view of the propulsion mounting plate.

A launch vehicle will transport the propulsion module 19 and propulsion mounting plate 21, as shown in FIGS. 7A and 7B, to the Staging and Assembly Area.

The spacecraft assembly crew will then maneuver the propulsion module #6 19 and propulsion mounting plate 21 so that the four trusses 3 attached to the module 1, #5 structural support members 12 pass through the openings in the propulsion mounting plate 21. The assembly crew will then attach the four trusses 3 to the sides of the propulsion module #6 19, as shown in FIGS. 7A and 8.

Figure 10:
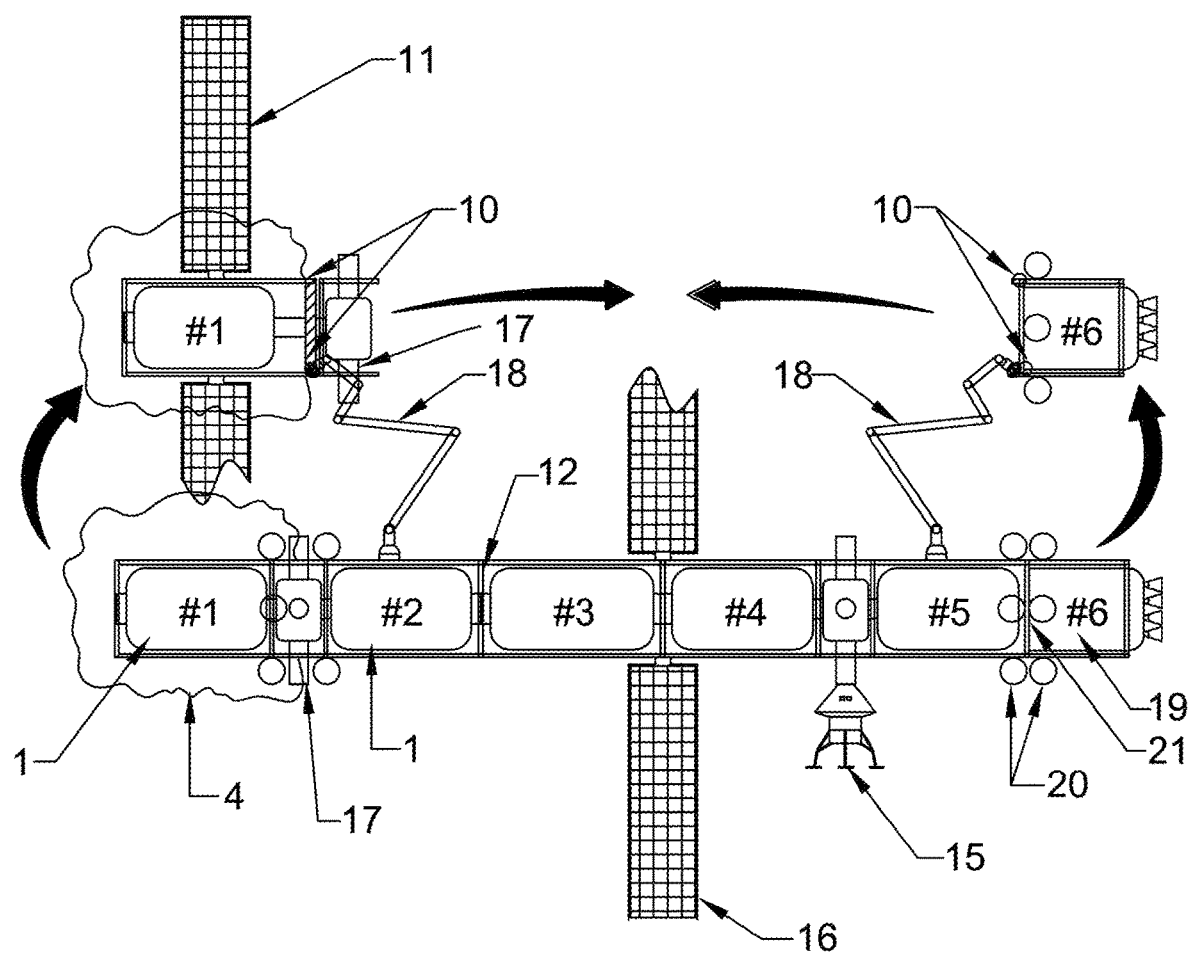
FIG. 10 is a top view of the robotic arms disconnecting the control module, the forward docking and airlock node, and the propulsion module.

The assembly crew will then install the primary computer network 23 in the control module 1, #1 and the secondary computer network 24 in Module 1, #3. They will then install various software packages, wire the various systems together, power all of the systems, and test them. Each of the computer networks will be capable of controlling all of the spacecraft's systems, providing redundancy until the modules are separated during the process of docking and mating the elements of the Crew Return Vehicle, as shown in FIGS. 10 and 11. Thereafter, the primary computer network will control the Crew Return Vehicle, and the secondary computer network will control the remaining modules 1, #2 through #5 that remain in the destination orbit.

One or more launch vehicles will transport scientific equipment, experiments, food, water, and other supplies to the Staging and Assembly area.

The assembly crew will then load the equipment, experiments, and supplies into modules 1, #2 through #5 as shown in FIGS. 12A and 12B.

Finally, the spacecraft assembly crew will fuel the aft storage tanks. If chemical propulsion is used, liquid hydrogen and oxygen may be purchased from a commercial space mining and processing company, or purchased from the operator of a fuel depot at the Staging and Assembly area. The interplanetary spacecraft is now ready to embark upon a historic journey.

4. How to Use the Invention

Figure 9A:
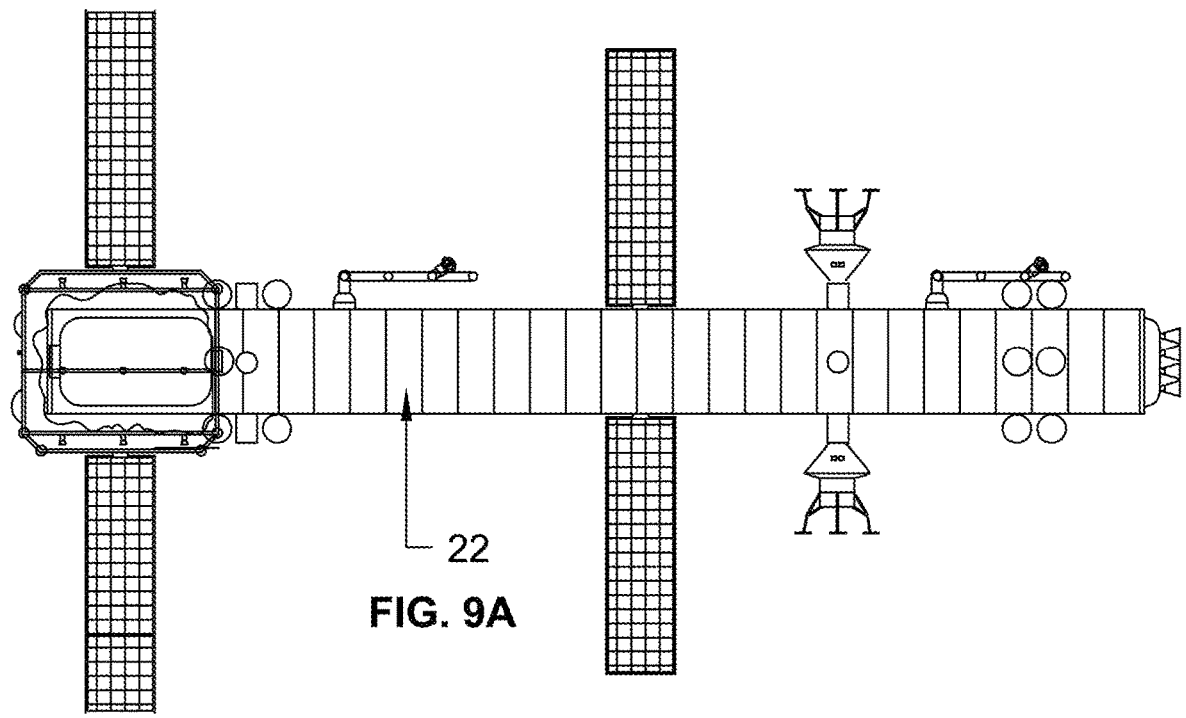
FIG. 9A is a top view of the assembled spacecraft with channeled shielding curtains attached to the truss structure.
Figure 9B:
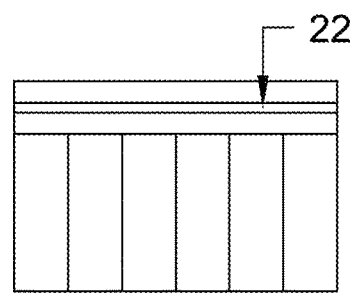
FIG. 9B is a front view of a portion of the channeled shielding curtain showing the closure at the top of the curtain.

The assembled spacecraft shown in FIGS. 8 and 9A can be used to safely transport humans from Earth-Moon Lagrangian points L4 or L5 and to deep-space destinations such as the Moon and Mars. During the flight through deep space, the crew and passengers will primarily inhabit the expandable control module 1, #1 inside the asteroid cavity 25, for maximum radiation protection.

Upon arrival at their destination, the crew and passengers can utilize two lander spacecraft 15 docked to the aft docking node 17 for short-term trips to neighboring celestial bodies, which might include the Moon, Phobos, Deimos, and/or Mars.

Owner/operators of the interplanetary spacecraft may offer a prize for, or execute a contract with, a commercial space mining company or other organization to deliver an ice-bearing asteroid with attached in situ resource utilization (ISRU) equipment to the interplanetary spacecraft's destination orbit, prior to arrival of the interplanetary spacecraft. Either during transport from cislunar space, or at the destination orbit, the ISRU equipment can remove water from the asteroid and break it up into hydrogen and oxygen for use as rocket fuel for the Crew-Return Vehicle. In the alternative, the commercial mining company or other organization could mine and process the water at the asteroid's original location, and then deliver tanks of hydrogen and oxygen to the interplanetary spacecraft's destination orbit.

Upon completion of their work at the destination orbit, the crew of the interplanetary spacecraft will use the forward robotic arm 18 and grapple fixtures 10 to detach from module 1, #2 the asteroid 4 containing the control module 1, #1 and the attached forward docking and airlock node 17. The crew will use the aft robotic arm 18 and grapple fixtures 10 to detach the propulsion module 19 and attached propulsion mounting plate 21 from module 1, #5. As shown in FIG. 11, the crew will then use the aft robotic arm 18 and grapple fixtures 10 to maneuver and mate the forward side of the propulsion mounting plate 21, with attached propulsion module 19, to the aft side of forward docking and airlock node 17, with attached asteroid 4 and control module 1, #1. These three modules (asteroid 4/control module 1,#1+forward docking and airlock node 17+propulsion module 19 and propulsion mounting plate 21) will comprise a Crew-Return Vehicle that will return the crew to the Staging and Assembly area.

After mating the Crew-Return Vehicle modules, the crew will refuel the aft spherical storage tanks 20 if the module includes chemical propulsion. The crew will then return to the Staging and Assembly area in the Crew-Return Vehicle.

A space capsule launched from Earth will rendezvous and dock with the crew-return vehicle at the Staging and Assembly area. The crew will then return to the Earth's surface in the capsule. The crew-return vehicle will remain at the Staging and Assembly area for use in future missions.

5. Examples of the Invention

Thus it will be appreciated by those skilled in the art that the present invention is not restricted to the particular best mode embodiments described with reference to the drawings, and that variations may be made therein without departing from the scope of the present invention as defined in the appended claims and equivalents thereof.

What is claimed is:

1. A human-crewed modular interplanetary spacecraft configured to be launched from an Earth-Moon Lagrangian point to an orbit around a celestial body comprising:

an asteroid that has been hollowed-out to form a cavity inside the asteroid that has walls at least two meters thick;

an asteroid superstructure including eight connected secondary truss sections configured for mounting sensors, cameras, spherical storage tanks, attitude-control thrusters and communications equipment;

five expandable habitation modules, one of which, Module #1 is expanded inside the cavity in the hollowed-out asteroid to serve as a command module, the aft end of said command and habitation Module #1 being mated to the forward side of a forward docking-and-airlock node, the aft side of said forward docking-and-airlock node being docked and mated to the forward end of Module #2, the aft end of said Module #2 being docked and mated to the forward end of Module #3, the aft end of said Module #3 being docked and mated to the forward end of Module #4, the aft end of said Module #4 being docked and mated to the forward side of an aft docking-and-airlock node, the aft side of said aft docking-and-airlock node being docked and mated to the forward end of Module #5, the aft end of said Module #5 being mated to a propulsion mounting plate;

four primary trusses that are attached to structural support members comprising an upper port truss, an upper starboard truss, a lower port truss and a lower starboard truss, said trusses being parallel to habitation Modules #1 through #5 and a propulsion Module #6;

the forward and aft docking-and-airlock nodes comprising:

an airlock at the top of each node that is even with the upper port truss and the upper starboard truss, two docking ports on the port and starboard sides of the forward docking-and-airlock node configured to dock with human-crewed space capsules, two docking ports on the port and starboard sides of the aft docking-and-airlock node configured to dock with two landing-and-ascent vehicles, two docking ports on each docking-and-airlock node configured to dock and mate with the expandable habitation Modules, one on the forward side of each node and one on the aft side of each node, said docking-and-airlock nodes being docked and mated between habitation Modules #1 and #2, which include the forward docking-and airlock node, and between Modules #4 and #5, which include the aft docking-and-airlock node;

said landing-and-ascent vehicles configured to land on and ascend from celestial bodies, one landing-andascent vehicle being docked to the port side of the aft docking-and-airlock node and the other landing-and-ascent vehicle being docked to the starboard side of the aft docking-and-airlock node;

a mounting plate affixed to the forward end of the cavity in the hollowed-out asteroid with an opening in the center of the mounting plate that is configured to support the forward end of habitation Module #1;

a mounting plate that is attached to the propulsion Module #6, said mounting plate having four openings such that one primary truss can be passed through each opening, said primary trusses then being attached to the sides of the propulsion Module #6;

a sealing plate having four openings such that one primary truss can be passed through each opening, and an opening in the center that is configured to support the aft end of Module #1, said sealing plate being affixed to the aft end of the hollowed-out asteroid to seal the expandable Module #1 inside the asteroid;

eight of said deployable structural support members that are mounted on the forward and aft ends of habitation Module #2 through Module #5;

two Mobile Transporter Carts, and two Mobile Remote Servicer Base Systems that are attached to the bottoms of said Mobile Transporter Carts;

two robotic arms that are configured to grapple and maneuver habitation Module #1, the surrounding asteroid, and asteroid superstructure secondary trusses, as well as habitation Module #2 through Module #5 and propulsion Module #6, each of said robotic arms being attached to one of the two Mobile Transporter Carts which are supported by one of the two Mobile Remote Servicer Base Systems, said robotic arms, carts and support systems being configured to move along rails affixed to the spacecraft's upper truss on the starboard side of the spacecraft, thereby permitting the forward robotic arm to be positioned anywhere from the center of the spacecraft to the forward end of habitation Module #2, and the aft robotic arm to be positioned anywhere from the center of the spacecraft to the aft end of habitation Module #5;

two dexterous end-effectors that can be attached to the ends of the robotic arms;

grapple fixtures that are attached to points on the spacecraft and on the two landing-and-ascent vehicles that permit the robotic arms to attach to the grapple fixtures during spacecraft maintenance and operational activities;

two primary solar arrays that are attached to the lower primary trusses below the point where habitation Module #3 and Module #4 are docked together;

two secondary solar arrays that are attached to the lower secondary trusses on the port and starboard sides of the asteroid superstructure;

a primary computer network that is installed in habitation Module #1 and connected to all spacecraft systems;

a secondary computer network that is installed in habitation Module #3 and connected to all spacecraft systems;

said spherical storage tanks attached to the secondary trusses in the asteroid superstructure, and attached to the four primary trusses immediately forward of the propulsion mounting plate;

said attitude-control thrusters mounted on the secondary trusses of the asteroid superstructure, and at other points on the primary configured to maneuver the spacecraft;

propulsion Module #6, mounted on the aft side of the propulsion mounting plate and affixed to the four primary trusses that pass through the propulsion mounting plate; and four channeled radiation-shielding curtains that are filled with pulverized asteroidal material and attached to the primary trusses on all four sides of the spacecraft from immediately aft of the sealing plate to the aft end of habitation Module #5.

2. The modular interplanetary spacecraft according to claim 1, wherein some or all of the spacecraft assembly tasks are performed by robots.

3. The modular interplanetary spacecraft according to claim 1, wherein said spacecraft includes a magnetic field generator mounted on the forward lower truss of the asteroid superstructure that provides additional radiation shielding for the spacecraft and crew.

4. The modular interplanetary spacecraft according to claim 1 that includes thermal system radiators in lieu of, or in addition to thermal radiators that are incorporated in the expandable modules.

5. The modular interplanetary spacecraft according to claim 1 that includes life support systems in lieu of, or in addition to the life support systems that are incorporated in the expandable habitation Modules #1 through Module #5.

* * * * *